United States Patent
Knittel

(10) Patent No.: US 8,528,878 B2
(45) Date of Patent: Sep. 10, 2013

(54) ROTARY CONTROL UNIT, IN PARTICULAR NOMINAL VALUE ROTARY CONTROL UNIT, FOR A VEHICLE HEATING SYSTEM AND IN PARTICULAR VEHICLE AIR CONDITIONING SYSTEM

(75) Inventor: Otto Knittel, Soest (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 642 days.

(21) Appl. No.: 12/301,863

(22) PCT Filed: May 23, 2007

(86) PCT No.: PCT/EP2007/054998
§ 371 (c)(1),
(2), (4) Date: Aug. 23, 2010

(87) PCT Pub. No.: WO2007/135169
PCT Pub. Date: Nov. 29, 2007

(65) Prior Publication Data
US 2010/0301243 A1    Dec. 2, 2010

(30) Foreign Application Priority Data

May 23, 2006    (DE) .................. 10 2006 024 066

(51) Int. Cl.
*F16K 31/02*    (2006.01)
(52) U.S. Cl.
USPC .................................... 251/129.04; 310/68 B
(58) Field of Classification Search
USPC .................. 251/129.03, 129.04; 454/75, 152, 454/155, 159, 160; 310/68 A, 68 B; 345/184
See application file for complete search history.

(56) References Cited

U.S. PATENT DOCUMENTS

| | | | |
|---|---|---|---|
| 5,844,500 A * | 12/1998 | Beuk et al. | 341/22 |
| 6,981,544 B2 * | 1/2006 | Iwanami et al. | 165/202 |
| 7,038,667 B1 * | 5/2006 | Vassallo et al. | 345/184 |

(Continued)

FOREIGN PATENT DOCUMENTS

EP    1 513 038    3/2005
FR    2 833 387    6/2003

OTHER PUBLICATIONS

International Search Report for corresponding application No. PCT/EP2007/054998 dated Aug. 21, 2007.

*Primary Examiner* — John K Fristoe, Jr.
*Assistant Examiner* — Reinaldo Sanchez-Medina
(74) *Attorney, Agent, or Firm* — Renner, Otto, Boisselle & Sklar, LLP

(57) ABSTRACT

The rotary control unit to which the invention relates, in particular nominal value rotary control unit for a vehicle heating system and in particular vehicle air conditioning system, is provided with a rotatable rotary control element (14), an electric motor (16) with a driveshaft (17) which is mechanically coupled to the rotary control element (14), an control circuit (24) for supplying the electric motor (16) with power for the purpose of generating a holding moment in order to prevent undesired rotation of the rotary control element (14) and/or to build up a resistance as the rotary control element is rotated, and a sensor unit (22) for detecting a hand which is approaching the rotary control element (14) or is touching the rotary control element (14). The control circuit (24) for supplying power to the electric motor (16) can be activated if the sensor unit (22) detects a hand which is approaching the rotary control element (14) or is touching the rotary control element (14).

14 Claims, 1 Drawing Sheet

(56) References Cited

U.S. PATENT DOCUMENTS

| | | | |
|---|---|---|---|
| 7,413,007 B2* | 8/2008 | Yamaoka | 165/202 |
| 2004/0007926 A1* | 1/2004 | Tsukada | 310/68 B |
| 2004/0095152 A1* | 5/2004 | Ho | 324/686 |
| 2006/0082545 A1 | 4/2006 | Choquet et al. | |
| 2006/0105698 A1 | 5/2006 | Butera et al. | |
| 2008/0004769 A1* | 1/2008 | Lenneman et al. | 701/36 |
| 2009/0318069 A1* | 12/2009 | Konet | 454/155 |

* cited by examiner

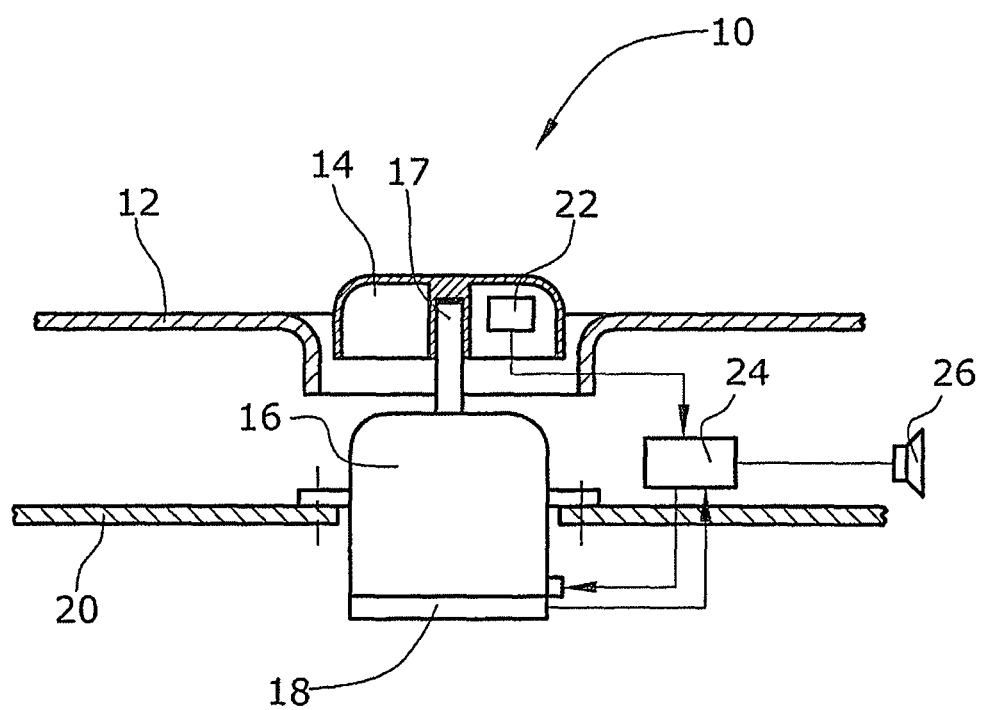

ROTARY CONTROL UNIT, IN PARTICULAR NOMINAL VALUE ROTARY CONTROL UNIT, FOR A VEHICLE HEATING SYSTEM AND IN PARTICULAR VEHICLE AIR CONDITIONING SYSTEM

The invention is directed to a rotary control unit, in particular nominal value control unit, for a vehicle heating system and in particular vehicle air conditioning system.

Rotary control units for the manual control of the various components of a vehicle are generally known. For example, with a vehicle heating system and in particular a vehicle air conditioning system, a rotatable rotary control element is used to set the nominal temperature. With consideration to different design requirements, it is common practice that the rotary control units have different properties regarding haptics. For example, depending on the vehicle manufacturer, the rotary control units differ in the smoothness or stiffness of their adjustability. The catching points that may be provided to increase the comfort upon turning the rotary control elements may also differ from one vehicle manufacturer to another regarding their position and degree of catching.

BACKGROUND

It is known to realize all above mentioned parameters in a rotary control element by using an electric motor to realize the holding moment or the counter torque acting on a rotary control element, the rotary control element being mechanically coupled with the drive shaft of the electric motor. Such systems are also referred to as forced feedback systems. Depending on their structure, the electric motors of such systems require a substantial current feed to generate the respective moment, thereby resulting in power losses having adverse effects on the overall energy balance.

SUMMARY OF THE INVENTION

The present invention provides a rotary control unit, and in particular a nominal value rotary control unit, for a vehicle component, wherein the rotary control unit is provided with an electric motor to generate a holding moment or counter torque and causes only little power loss.

In accordance with the invention, a rotary control unit, in particular a nominal value control unit, for a vehicle heating system and in particular a vehicle air conditioning system, the rotary control unit comprising comprises
  a rotatable rotary control element,
  an electric motor with a drive shaft that is mechanically coupled with the rotary control element,
  a control circuit for supplying current to the electric motor so as to generate a moment acting in or against the sense of rotation to prevent an unintentional rotation of the rotary control element and/or to build up a resistance as the rotary control element is rotated, and
  a sensor unit for detecting a hand approaching the rotary control element or touching the rotary control element,
  the control circuit being activatable to supply current to the electric motor, if the sensor unit detects a hand which is approaching the rotary control element or is touching the rotary control element.

In the invention, the sensor unit is configured to detect a hand approaching the rotary control element or touching the rotary control element. When this proximity sensor responses, the control circuit is activated to supply current to the electric motor for the purpose of generating the moment acting in or against the sense of rotation (holding moment or counter torque, respectively).

As an alternative to and a variant of the above, the invention further provides a rotary control unit comprising
  a rotatable rotary control element,
  an electric motor with a drive shaft that is mechanically coupled with the rotary control element,
  control circuit for supplying current to the electric motor so as to generate a moment acting in or against the sense of rotation to prevent an unintentional rotation of the rotary control element and/or to build up a resistance as the rotary control element is rotated, and
  a sensor unit for detecting a rotation of the rotary control element,
  the control circuit for supplying current to the electric motor being activatable if the sensor unit detects a rotation of the rotary control element.

In this alternative, the rotary control unit comprises a sensor unit that detects whether the rotary control element is being rotated or not. When a change is detected, the control circuit for supplying current to the electric motor is activated so as to generate the holding moment (or counter torque) (moment acting in or against the sense of rotation, respectively).

In both cases, a current supply to the electric motor is provided only if an adjustment of the rotary control element is intended, i.e., if a desired actuation of the rotary control element is detected in the form of a hand approaching or touching the rotary control element or the beginning of a rotation thereof. Thus, the electric motor can be deactivated during other times, resulting in energy saving and a reduction of power losses in the electric motor.

In an advantageous development of the invention, the sensor unit can be provided with a position sensor for detecting a rotation of the drive shaft of the electric motor. Such electric motors (with position sensors) are common and can advantageously be used in the invention. The position sensor is also necessary for the variation of the holding moment or counter torque of the electric motor drive shaft as a function of the rotation of the rotary control element. After the control circuit has been activated, it may evaluate the position sensor and may predetermine a defined moment depending on the rotational position of the drive shaft and thus of the rotary control element.

In addition, the sensor unit of the above mentioned first variant of the invention may further be provided with a proximity or touch sensor device for detecting a hand approaching the rotary control element or a hand touching the rotary control element.

For a further advantageous development of the rotary control elements of the two variants of the invention, the control circuit may supply different levels of electric energy to the electric motor to generate holding moments and/or counter torques of different magnitudes depending on the actual rotational position of the drive shaft, wherein the rotary control element may generally be arranged on the drive shaft of the electric motor for rotation therewith, and wherein it is further possible for the electric motor to be a DC motor with a commutator.

With the present concept of the activation of the moment generated by the electric motor and acting in or against the sense of rotation (holding moment or counter torque), it is further not only possible to act electromechanically on the rotary control element when a rotation of this element is effected or intended, but also to generate acoustic signals as a function of the rotation of the rotary control element, which signals may simulate a catching sound, for example.

The concept of the invention allows
to build up the moment acting in or against the sense of rotation (holding moment or counter torque) only when a hand approaches the rotary control element or when a hand touches the same or the rotary control element is adjusted, in order to prevent an overheating of the electric motor,
to predetermine the absolute value of the holding moment or the counter torque by changing the supply voltage to the motor, the supply voltage being predetermined or changed as a function of the rotational angle,
to effect the activation of the electric motor by a rectangular wave in such a manner that the electric motor is operated, for the first half period of activation, to rotate in one direction and, for the second half period of activation, to rotate in the opposite direction, wherein the frequency at which this is effected is chosen so high that no vibrations can be felt at the rotary control element.

In its most general form, the invention thus relates to a rotary control unit, in particular a nominal value rotary control unit, for a vehicle heating system and in particular a vehicle air conditioning system comprising a sensor and electronic unit for detecting an intended operation of the nominal value rotary control unit, wherein the sensor and electronic unit activates the nominal value rotary control unit such that a moment can be initiated that acts in or against the sense of rotation. With this rotary control unit, the detection of an intended operation is effected when the unit is approached or touched or upon a beginning rotation thereof. The sensor and electronic unit especially activates an electric motor with a drive shaft that is mechanically coupled with the rotary control element and thereby allows for a current supply to the motor so that a moment acting in or against the sense of rotation can be generated for the purpose of saving energy and reducing power losses. In this context, a position sensor may be provided to detect a rotation of the drive shaft, the sensor being fixedly coupled with the drive shaft. It may be provided that, after activation by the sensor and electronic unit, the electronic unit evaluates the position sensor and a defined moment is given in dependence on the position of the position sensor. Further, it is possible to generate acoustic signals using another electronic device and an acoustic emitter, depending on the rotation of the rotary control element, the signals simulating a catching sound, for example.

BRIEF DESCRIPTION OF THE DRAWING

The invention will be discussed in detail hereinafter with reference to the drawing which is a schematic and partial illustration of a control device for a vehicle air conditioning system.

DETAILED DESCRIPTION

In the embodiment to be described herein, the control device 10 has a front cover 12 which, besides various control elements and one or more displays, is also provided with a rotary control element 14 for setting the nominal temperature. In this embodiment, the holding moment or counter torque for the rotary control element 14 is generated by an electric motor 16 with a commutator (not illustrated in detail), which comprises a drive shaft 17 and has a position sensor 18 for detecting the rotational position of the drive shaft 17. The housing of this motor 16 is located on a support or conductor plate 20 having various electric, electro-optic and electronic components thereon (not illustrated in detail). The rotary control element 14 is set on the drive shaft 17 and connected therewith so as to rotate with the same. As an alternative, a transmission may be provided between the axis of rotation of the rotary control element 14 and the drive shaft 17.

The rotary control element 14 (or the front cover 12) includes a proximity sensor 22 detecting a hand approaching the control element 14 or the contact made by a hand. The output signal of the proximity sensor 22, as well as the signal of the position sensor 18 are supplied to an control circuit 24 which in turn effects the electric activation of the electric motor 16.

The activation of the electric motor 16 for the build-up of a holding moment or a counter torque of the rotary control element 14 as a function of the rotational position of the rotary control element is generally known in prior art. Depending on the design requirements, the holding moment or the counter torque may be shortly increased by a correspondingly varying supply of current so as to imitate catches, when the rotary control element is rotated through the individual imitated catching points. The invention is about an initiation of this activation only when a rotation of the rotary control element 14 is actually intended. This is realized by means of the proximity sensor 22 which triggers the control circuit 24 only when it responds. Other rotations of the rotary control element, which are caused unintentionally, for example, by accidentally passing an object along the rotary control element 14, thereby rotating the rotary control element, are suitably ignored by electrically evaluating only such rotations of the rotary control element 14, and by interpreting only these as intentional adjustments, which have caused the proximity sensor 22 to respond during the adjustment of the rotary control element 14.

The current supply to the electric motor 16 after an activation is suitably deactivated again as soon as the proximity sensor 22 no longer detects a hand near the control element 14 or a hand touching the rotary element 14.

Instead of the proximity sensor 22, it may be sufficient for the invention to realize the build-up of the holding moment or the counter torque as a function of the response of the position sensor 18. The position sensor 18 thus also serves to activate the current supply to the electric motor 16. Further, the embodiment described herein may provide for the generation of an acoustic signal, e.g. in the form of a catching sound, by means of an electro-acoustic transducer 26 activatable by the control circuit 24 or a unit downstream thereof.

LIST OF REFERENCE NUMERALS

10 control device
12 front cover
14 rotary control element
16 electric motor
17 drive shaft of the electric motor
18 position sensor
20 conductor plate
22 proximity sensor
24 control circuit
26 electro-acoustic transducer

The invention claimed is:
1. A rotary control unit comprising a rotatable rotary control element,
an electric motor with a drive shaft that is mechanically coupled with the rotary control element,
a control circuit for supplying current to the electric motor so as to generate a moment acting in or against the sense of rotation to prevent an unintentional rotation of the rotary control element and/or to build up a resistance as the rotary control element is rotated, the control circuit supplies different current levels to the electric motor to generate different magnitudes of holding moments and/or counter torques depending on the actual rotational position of the drive shaft, and a sensor unit for detecting a hand approaching the rotary control element or touching the rotary control element, the control circuit being activatable to supply current to the electric motor, if the sensor unit detects a hand which is approaching the rotary control element or is touching the rotary control element.

2. The rotary control element of claim 1, wherein the control circuit is deactivatable to terminate the supply of current to the electric motor after activation, if the sensor unit does not detect a rotation of the rotary control element or no longer detects a hand near the rotary control element or touching the same.

3. The rotational control element of claim 2, wherein the rotary control element is arranged on the drive shaft of the electric motor so as to rotate therewith.

4. The rotational control element of claim 3, wherein the electric motor is a DC motor with a commutator.

5. The rotational control element of claim 4, wherein the sensor unit has a position sensor for detecting a rotation of the drive shaft of the electric motor.

6. The rotational control element of claim 2, wherein the electric motor is a DC motor with a commutator.

7. The rotational control element of claim 6, wherein the sensor unit has a position sensor for detecting a rotation of the drive shaft of the electric motor.

8. The rotational control element of claim 2, wherein the sensor unit has a position sensor for detecting a rotation of the drive shaft of the electric motor.

9. The rotational control element of claim 1, wherein the rotary control element is arranged on the drive shaft of the electric motor so as to rotate therewith.

10. The rotational control element of claim 9, wherein the electric motor is a DC motor with a commutator.

11. The rotational control element of claim 10, wherein the sensor unit has a position sensor for detecting a rotation of the drive shaft of the electric motor.

12. The rotational control element of claim 1, wherein the rotary control element is arranged on the drive shaft of the electric motor so as to rotate therewith.

13. The rotational control element of claim 1, wherein the electric motor is a DC motor with a commutator.

14. The rotational control element of claim 1, wherein the sensor unit has a position sensor for detecting a rotation of the drive shaft of the electric motor.

\* \* \* \* \*

UNITED STATES PATENT AND TRADEMARK OFFICE
CERTIFICATE OF CORRECTION

PATENT NO. : 8,528,878 B2  Page 1 of 1
APPLICATION NO. : 12/301863
DATED : September 10, 2013
INVENTOR(S) : Otto Knittel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this
Fifteenth Day of September, 2015

Michelle K. Lee
*Director of the United States Patent and Trademark Office*